(12) United States Patent
Bethune et al.

(10) Patent No.: US 6,218,657 B1
(45) Date of Patent: Apr. 17, 2001

(54) SYSTEM FOR GATED DETECTION OF OPTICAL PULSES CONTAINING A SMALL NUMBER OF PHOTONS USING AN AVALANCHE PHOTODIODE

(75) Inventors: Donald S. Bethune, San Jose; Ralph G. Devoe, Palo Alto; Christian Kurtsiefer; Charles T. Rettner, both of San Jose; William P. Risk, Sunnyvale, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/172,759

(22) Filed: Oct. 15, 1998

(51) Int. Cl.$^7$ .................................................. H01J 40/14
(52) U.S. Cl. .................................... 250/214 R; 250/214.1
(58) Field of Search ............................. 250/214.1, 214 R, 250/214 A, 214 AG, 214 LA, 214 C; 327/326, 320, 323, 502, 504, 514, 538; 702/191, 193; 359/189, 124, 195

(56) References Cited

U.S. PATENT DOCUMENTS 4,754,131   6/1988   Bethea et al. .
4,770,483 * 9/1988   Ridgway .............................. 385/24

(List continued on next page.)

FOREIGN PATENT DOCUMENTS

WO 97/43840   11/1997   (WO) .

OTHER PUBLICATIONS

Levine et al., Single Photon Detection at 1.3μm Using A Gated Avalanche Photodiode, Appl. Phys. Lett., 44 (5), Mar. 1, 1984, pp. 553–555.

Levine et al., 10–MHz Single Photon Counting at 1.3μ, Appl. Phys. Lett., 44 (6), Mar. 15, 1984, pp. 581–582.

(List continued on next page.)

Primary Examiner—John R. Lee
(74) Attorney, Agent, or Firm—Thomas R. Berthold; Banner & Witcoff, Ltd.

(57) ABSTRACT

An avalanche-type detector circuit includes an avalanche-type photon detector device, a coupling capacitor, a bias network, a first transmission line and a second transmission line. The coupling capacitor has a first terminal that is coupled to a first terminal of the avalanche-type photon detector device. A first terminal of the bias network is coupled to the first terminal of the avalanche-type photon detector device, while a second terminal of the bias network is coupled to a bias voltage so that the avalanche-type photon detector device is reverse biased. A first end of the first transmission line is coupled to a second terminal of the coupling capacitor, and second end of the first transmission line is terminated by an open-circuit termination. A first end of the second transmission line is coupled to a second terminal of the avalanche-type photon detector device. The second end of the second transmission line is terminated by a short-circuit termination. A bias pulse voltage $V_{pulse}$ is coupled to the second terminal of the coupling capacitor such that the bias pulse voltage reverse biases the avalanche-type photon detector device to be greater than a reverse breakdown voltage $V_{br}$ of the avalanche-type photon detector device during a duration of the bias pulse voltage $V_{pulse}$. A round-trip propagation delay along the first transmission line is substantially equal to a round-trip propagation delay along the second transmission line.

44 Claims, 9 Drawing Sheets

U.S. PATENT DOCUMENTS

| | | | |
|---|---|---|---|
| 4,963,727 | * 10/1990 | Cova | 250/214 R |
| 5,046,139 | * 9/1991 | Kahn | 359/124 |
| 5,307,410 | 4/1994 | Bennett . | |
| 5,933,042 | * 8/1999 | Trottier et al. | 327/326 |
| 5,953,690 | * 9/1999 | Lemon et al. | 702/191 |

OTHER PUBLICATIONS

Levine et al., Detection of Single 1.3μm Photons at 45 Mbit/s, Electronics Letters, 20 (6), Mar. 15, 1984, pp. 269–271.

Levine et al., Near Room Temperature 1.3μm Single Photon Counting With A InGaAs Avalanche Photodiode, Electronics Letters, 20 (14), Jul. 5, 1984, pp. 596–598.

Levine et al., Optical Time Domain Reflectometer Using a Photon–Counting InGaAs/InP Avalanche Photodiode At 1.3μm, Electronics Letters, 21 (2), Jan. 17, 1985, pp. 83–84.

Brown et al., Characterization of Silicon Avalanche Photodiodes for Photon Correlation Measurements. 1: Passive Quenching, Applied Optics, 25 (22), Nov. 15, 1986, pp. 4122–4126.

Brown et al., Characterization of Silicon Avalanche Photodiodes for Photon Correlation Measurements. 2: Active Quenching, Applied Optics, 26 (12), Jun. 15, 1987, pp. 2383–2389.

Owens et al., Photon Counting with Passively Quenched Germanium Avalanche, Applied Optics, 33 (30), Oct. 20, 1994, pp. 6895–6901.

Cova et al., Avalanche Photodiodes and Quenching Circuits for Single–Photon Detection, Applied Optics, 35 (12), Apr. 20, 1996, pp. 1956–1976.

Bennett et al., Quantum Cryptography: Public Key Distribution and Coin Tossing, Proc. Int. Conf. on Computers, Systems & Signal Processing, Bangalore, India, Dec. 10–12, 1984, Paper presented pp. 175–179.

Bennett, Quantum Cryptography Using Any Two Nonorthogonal States, Phys. Review Lett., 68 (21), May 25, 1992, pp. 3121–3124.

Bennett et al., Experimental Quantum Cryptography, appeared in Journal of Cryptology, 5 (3), 1992, pp. 1–28.

Li et al., Single Photon Avalanche Diode For Single Molecule Detection, Rev. Sci. Instrum. 64 (6), Jun. 1993, pp. 1524–1529.

Hanselman et al., Side–On Photomultiplier Gating System for Thomson Scattering and Laser–Excited Atomic Fluorescence Spectroscopy, 45 (9), 1991, pp. 1553–1560.

Martini et al., Photomultiplier Gate For Stimulated–Spontaneous Light Scattering Discrimination, Rev. Sci. Instrum. 38 (7), pp. 866–868.

Bristow et al., Signal Linearity, Gain Stability, and Gating in Photomultipliers: Application to Differential Absorption Lidars, Applied Optics, 34 (21), Jul. 20, 1995, pp. 4437–4439.

Young et al., Experimental Demonstration of a 100–ps Microchannel Plate Framing Camera, Rev. Sci. Instrum., 57 (11), Nov. 1986, pp. 2729–2732.

Gostein et al., Eliminating Microchannel Plate Response to Scattered Laser Light in a Multiphoton Ionization Experiment, Rev. Sci. Instrum, 65 (9), Sep. 1994.

Gostein et al., Improved Gating of Microchannel Plates for Multiphoton Ionization Experiments, Rev. Sci. Instrum., 66 (5), May 1995, pp. 3389–3390.

Warble, Gating of Photomultipliers, Thorn EMI Electron Tubes Photodetection Information Service (brochure), 4 pages.

* cited by examiner

SYSTEM FOR GATED DETECTION OF OPTICAL PULSES CONTAINING A SMALL NUMBER OF PHOTONS USING AN AVALANCHE PHOTODIODE

BACKGROUND OF THE INVENTION

1. Field of the Invention

The present invention relates to the field of optics. More particularly, the present invention relates to a circuit for detecting optical pulses that contain a small number of photons.

2. Description of the Related Art

Detection of optical pulses at the level of a single photon is important for many scientific and engineering applications, such as optical communications, quantum cryptography, time-resolved spectroscopy and quantum optics.

A semiconductor device known as an avalanche photodiode (APD) can be used for single-photon counting and/or for triggering a sequence of events that are time-dependent upon the incidence of a photon. See, for example, S. Cova et al., Review of photon counting with APD's, Appl. Opt., 35(12), p. 1956, 1996. A silicon APD provides detection of visible and near-infrared light to about 1 $\mu$m wavelength. Both Ge- and InGaAs-type APD's are used for detecting light at 1.3 $\mu$m, one of the two preferred telecommunications wavelengths, while only InGaAs-type APD's are suitable for detecting light at 1.55 $\mu$m, the other preferred telecommunications wavelength. Photomultipliers (PMTs) and multichannel plate (MCP) detectors are also used for detecting single photons and/or for triggering a sequence of events that are time-dependent upon the incidence of a photon. Time gating the gain of any of these devices can provide discrimination with respect to scattered light and information about the time variation of the light intensity.

When an APD is biased above its reverse breakdown voltage $V_{br}$ in the so-called "Geiger mode", a single photon that is absorbed by the APD excites a single conduction electron, which gains sufficient energy due to the bias voltage to excite secondary conduction electrons by collision cascade. The secondary conduction electrons can, in turn, excite more electrons and so forth, resulting in a current avalanche that can provide an electronic gain on the order of $10^5$–$10^8$.

Such an enormous gain can be used for generating charge pulses on the order of picoCoulombs (pC) within a few nanoseconds, producing corresponding voltages across a 50 Ohm load resistor on the order of millivolts to tens of millivolts that can readily be sensed by conventional electronic circuitry. Generally, the voltage pulses are amplified and applied to a discriminator that outputs a pulse only when an input voltage pulse exceeds a predetermined threshold level. Discrimination helps eliminate spurious counts, and provides an output pulse having fixed characteristics suitable for triggering counters or other electronic apparatus.

After an electron avalanche has been triggered by an incident photon, the current must be turned off, or quenched, and the APD restored to a state in which it is again sensitive to an incident photon. Several quenching schemes have been proposed. For example, active quenching techniques are disclosed by R. G. W. Brown et al., Active quenching of Si APD's, Appl. Opt., 26(12), p. 2383, 1987. Passive quenching techniques are disclosed by, for example, R. G. W. Brown et al., Passive quenching of Si APD's, Appl. Opt., 25(22), p. 4122, 1986, and by P. C. M. Owens et al., Passive quenching of Ge APD's, Appl. Opt., 33(30), p. 6895, 1994.

In active quenching, additional electronic circuitry monitors the onset of an avalanche, and terminates the avalanche as quickly as possible by dropping the bias voltage below the reverse breakdown voltage $V_{br}$ of the APD. In passive quenching, the current resulting from an avalanche flows through a quenching resistor, causing a voltage drop that momentarily reduces the bias voltage below the reverse breakdown voltage $V_{br}$ of the APD. Once the avalanche current stops flowing, both types of quenching schemes restore the bias to a level above $V_{br}$ as quickly as possible so that the APD is in a state in which it is sensitive to an incident photon.

When photon arrival time is arbitrary, restoring the bias level of the APD as quickly as possible minimizes the possibility that an incident photon will be missed. On the other hand, maintaining a constant bias above the reverse breakdown voltage makes an APD susceptible to avalanches triggered by thermally generated carriers, giving rise to a "dark count" rate. This rate can be reduced by cooling the device. Maintaining constant bias also makes the APD sensitive to spurious photons that may be incident upon the APD. Applying a continuous bias also limits how far above breakdown the device can be biased. A higher bias voltage leads to a higher quantum efficiency and faster response time, but with the drawback of a higher dark count rate.

In some applications, the potential arrival times of photons are accurately predictable, or a narrow time window of sensitivity is desired. In such cases, it is advantageous to use a "pulsed biasing" technique for detecting ultra-weak optical pulses. For pulsed biasing, the bias voltage of an APD detector is only raised above $V_{br}$ during the intervals of time when photon arrival is anticipated. Between these intervals the detector bias is reduced, suppressing both generation of dark counts and triggering caused by spurious photons. Pulsed biasing has significant advantages for clocked applications such as quantum cryptographic systems, for applications where one wishes to avoid detection of a strong flash of light that may precede a signal of interest, or for applications where it is desired to obtain accurate time-variation data.

An important consideration when an APD is used for detecting a single photon is that a fraction of the electrons that flow through the APD during an avalanche becomes trapped in defect or impurity states lying within the bandgap of the semiconductor. The trapped electrons can later be excited into the conduction band by thermal fluctuations, thus triggering spurious avalanches. To minimize the amount of trapped charge, it is highly desirable to minimize the total charge passing through the APD due to both photodetection events and dark counts. Pulse biasing inherently suppresses dark counts between the bias pulses by reducing the bias below $V_{br}$, and is particularly suited for InGaAs-type APD detectors because these type of detectors exhibit very high dark count rates when operated with constant bias.

A pulsed-bias technique for detecting a single photon at 1.3 $\mu$m using a Ge APD is disclosed by, for example, B. F. Levine et al., Pulse biased APD's, Appl. Phys. Lett., 44(5), p. 553, 1984. Relatively long bias pulses (~10 ns) were used with a maximum pulse repetition rate of 1 MHz. Subsequently, a short bias pulse (~1 ns) and a pulse repetition rate of 10 MHz is disclosed by B. F. Levine et al., Pulse biased APD's, Appl. Phys. Lett., 44(6), p. 581, 1984. Eventually, the pulse repetition rate was increased to 45 MHz, as disclosed by B. F. Levine et al., Pulse biased APD's, Electron. Lett., 20(6), p. 270, 1984. As another example, U.S. Pat. No. 4,754,131 issued Jun. 28, 1988, to Bethea et al. relates to use of APD's for detection of small numbers of photons using APD's.

FIG. 1 shows a voltage waveform diagram for biasing an avalanche photodiode for pulsed-biased single-photon counting. FIG. 2 shows a schematic diagram of a conventional APD detector circuit 20 that provides pulse-biasing for an avalanche photodiode. APD detector circuit 20 includes a coupling capacitor C1 and a resistor R1 that are both connected to the cathode of an avalanche photodiode APD1. The anode of avalanche photodiode APD1 is connected to a signal common through a load resistor $R_L$. A DC bias voltage $V_{DC}$ is applied to the cathode of avalanche photodiode APD1 through a resistor R1 so that avalanche photodiode APD1 is reverse-biased below the reverse breakdown voltage $V_{br}$ of avalanche photodiode APD1. A pulse bias voltage $V_{pulse}$ is applied through coupling capacitor C1. When a photon 21 is incident on avalanche photodiode APD1, the output signal of APD detector circuit 20 appears across load resistor $R_L$, which is typically a transmission line having a 50 Ohm characteristic impedance.

A key problem with a pulsed-bias technique is distinguishing a photon-induced avalanche from the large electrical transient caused by the bias pulse voltage. On the one hand, it is desirable to keep the DC bias voltage $V_{DC}$ well below the reverse breakdown voltage $V_{br}$ of an APD and use a large amplitude pulse to bring the total bias voltage above $V_{br}$. On the other hand, when the bias pulse $V_{pulse}$ is applied to avalanche photodiode APD1 through the conventional pulse-bias circuit shown in FIG. 2, the capacitance of avalanche photodiode APD1 produces a transient response across load resistor $R_L$ that is essentially the time derivative of bias pulse $V_{pulse}$. Avalanche photodiode APD1 is most sensitive at the peak of the bias pulse (corresponding to the zero crossing of the transient), so that when the photon-induced signal is smaller in amplitude than the capacitive transient, it will be "buried" in the transient. FIG. 3 shows a representative waveform diagram of a photon-induced signal 31 that is "buried" in a capacitive transient 32 of a pulse bias signal.

The biasing conditions used by Levine et al. made the photon-induced signals greater than the capacitive transient so that a discriminator could be set to respond only to the photo-induced signals. Specifically, the DC bias voltage $V_{DC}$ was only ~0.2 V below the reverse breakdown voltage $V_{br}$ of the APD and a $V_{pulse}$ signal $\geq 2$ V was used for driving the APD well above $V_{br}$, resulting in avalanches that moved relatively large amounts of charge (~4 pC) through the APD. Transporting such a large amount of charge has the disadvantage as noted above, that the relative amount of trapped charge and the dark count rate increase accordingly.

As mentioned, photomultipliers (PMTs) and multichannel plate (MCP) detectors are used for detecting single photons. The gain of PMT and MCP detectors increase exponentially with an increasing bias voltage and, consequently, can be temporarily switched on and off by applying a bias pulse voltage. Depending on the sign of the bias pulse, the gain of a PMT or a MCP device can be changed, or switched, to higher or lower levels.

PMTs are fabricated to have a cathode that yields electrons in response to incident light, and an electron multiplier formed by of a chain of dynodes. Each dynode yields multiple electrons for each incident electron. An anode at the end of the dynode chain collects electrons to form an output pulse that is typically a few nanoseconds wide resulting from variations in the electron transit times. In general, a single voltage is applied to a PMT that is divided by a resistor chain to provide a stepwise increase in voltage across the dynode chain. The gain of the photomultiplier can be switched by pulsing the overall voltage applied across the dynode chain to provide near-ideal gain switching having on/off gain ratios as high as $10^6$:1.

Applying a voltage pulse across the dynode chain, though, generates an undesirable pulse at the output by capacitive coupling the voltage pulse through the PMT that has such a significant amplitude that the technique of applying a voltage pulse across the dynode chain is rarely used. More commonly, the gain of a PMT is switched by pulsing the voltage applied to the cathode of a PMT, a first dynode of the dynode chain, selected groups of dynodes, or to a focussing electrode. See, for example, D. S. Hanselman et al., Side-on Photomultiplier gating system for Thompson scattering and laser-excited atomic fluorescence spectroscopy, Applied Spectroscopy, Vol. 45, p. 1553, 1991.

The ability to gate a PMT device is critical in applications such as LIDAR and other detection systems that are based on laser-excited fluorescence. In these types of systems, the intensity of the light that is to be measured is often significantly lower than the intensity of the excitation light. Consequently, a PMT is often gated for preventing the PMT from becoming saturated so time-critical measurements of the lower-intensity light level can be made.

Multichannel plates (MCPs) are sensitive to light, but are generally used for detecting particles such as ions or metastable atoms, or for detecting x-rays. MCPs are formed by a "bundle" of numerous micron-sized channels that each act as a separate electron multiplier. The resistance along each channel varies to provide a voltage gradient, so that only a single voltage is applied across a single plate. Single plates or pairs of plates are used so that the output of one plate is the input to a second plate, thus providing higher overall gain. In the case of a two-plate detector, the gain is switched by switching the voltage applied across the first plate.

MCPs are also gated for improving detection efficiency. A major concern is to keep the gain low during an initial laser (or other beam) pulse. Transit-time broadening is much less, relatively speaking, for an MCP because an MCP is much shorter in length than a PMT. For example, MCP pulses can be as short as 100 ps, consequently, MCPs can be gated on a timescale of this magnitude. Such gating is commonly used to allow very fast events, such as laser-induced detonations, to be followed in time.

What is needed is a way for detecting small charge pulses when using a pulsed-biasing technique for an avalanche photodiode, a photomultiplier or a multichannel plate detector circuit.

SUMMARY OF THE INVENTION

The present invention provides a way for detecting small charge pulses (<0.5 pC) when pulsed-biasing an avalanche photodiode, a photomultiplier or a multichannel plate detector circuit. To achieve this, the present invention reduces the amount of charge that must be generated for reliable photon detection during a bias pulse by effectively eliminating the capacitively-induced transient.

The advantages of the present invention are provided by an avalanche-type detector circuit that includes an avalanche-type photon detector device, a coupling capacitor, a bias network, a first transmission line and a second transmission line. The avalanche-type photon detector device can be an avalanche photodiode, a photomultiplier device and a multichannel plate device, while the first and second transmission lines can be formed by coaxial cables, stripline transmission lines or waveguides. The coupling capacitor has a first terminal that is coupled to a first terminal of the avalanche-type photon detector device. A first terminal of the bias network is coupled to the first terminal of the avalanche-type photon detector device, while a second terminal of the bias resistor is coupled to a bias voltage so that the avalanche-type photon detector device is reverse biased. A first end of the first transmission line is coupled to a second terminal of the coupling capacitor, and second end of the first transmission line is terminated by a first reflective termination that has a reflection coefficient $r_1$, which is the ratio of the voltage reflected from the termination to the voltage incident upon the termination. A first end of the second transmission line is coupled to a second terminal of the avalanche-type photon detector device. The second end of the second transmission line is terminated by a second reflective termination that has a second reflection coefficient $r_2$ that is opposite in sign from reflection coefficient $r_1$, that is, $r_2=-r_1$. Preferably, the first reflective termination is an open-circuit termination and the second reflective termination is a short-circuit termination, but the avalanche-type detector circuit can be configured so that the first reflective termination is a short-circuit termination and the second reflective termination is an open-circuit termination. A bias pulse voltage $V_{pulse}$ is coupled to the second terminal of the coupling capacitor such that the bias pulse voltage reverse biases the avalanche-type photon detector device to be greater than a reverse breakdown voltage $V_{br}$ of the avalanche-type photon detector device during a duration of the bias pulse voltage $V_{pulse}$. According to the invention, a round-trip propagation delay along the first transmission line is substantially equal to a round-trip propagation delay along the second transmission line.

BRIEF DESCRIPTION OF THE DRAWINGS

The present invention is illustrated by way of example and is not limited by the accompanying figures in which like reference numerals indicate similar elements and in which.

DETAILED DESCRIPTION

The present invention provides a technique for generating photon-induced signals with respect to a transient-free baseline by accurately cancelling a capacitively-coupled transient associated with a pulsed-bias voltage signal. Accordingly, the technique of the present invention works with any type of avalanche-type photon detector, including a silicon-based APD. Further, the present invention is simple, extremely reliable, and requires little adjustment.

Figure 1:
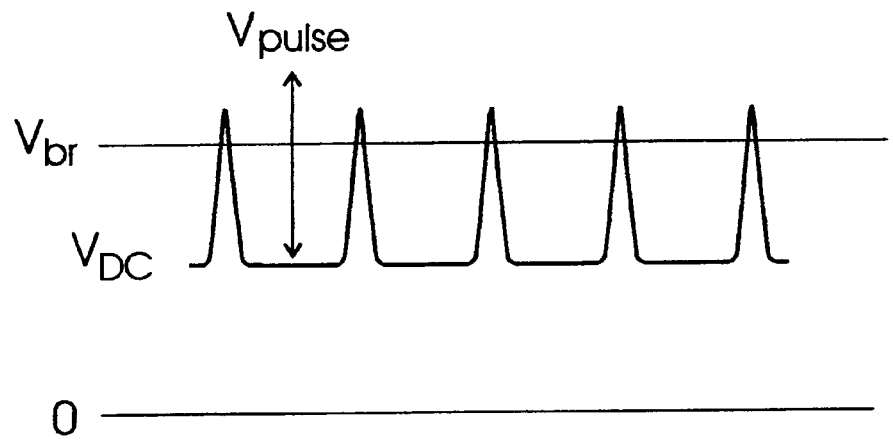
FIG. 1 shows a voltage waveform diagram for ideally biasing an avalanche photodiode for pulsed-biased single-photon counting.
Figure 2:
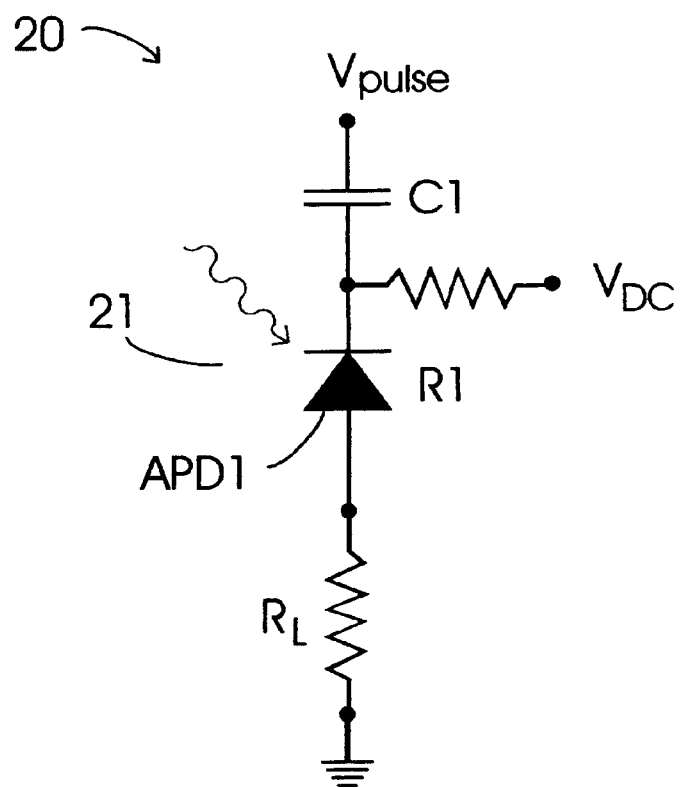
FIG. 2 shows a schematic diagram of a conventional APD detector circuit for pulse-biasing an avalanche photodiode.
Figure 3:
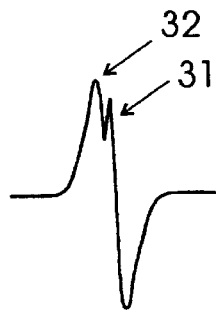
FIG. 3 shows a representative waveform diagram of a photon-induced signal that is "buried" in a capacitive transient of a pulse bias signal.
Figure 4:
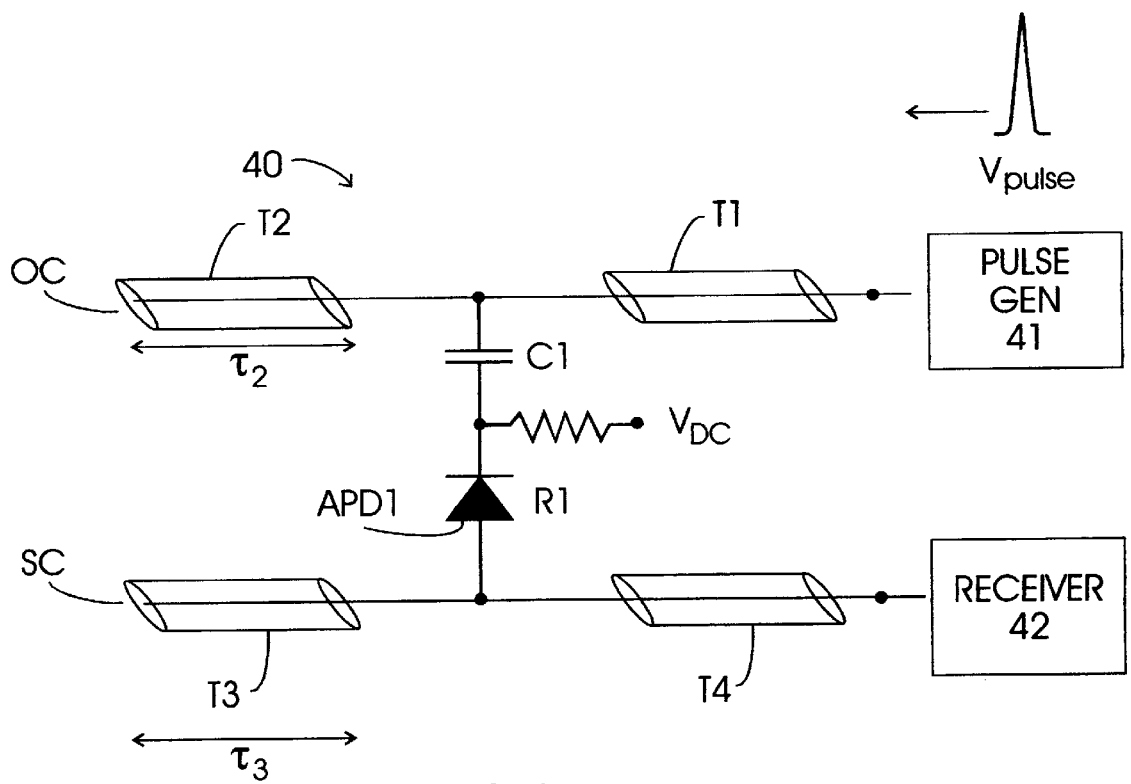
FIG. 4 shows a schematic diagram of a preferred embodiment of an APD detector circuit according to the present invention.

FIG. 4 shows a schematic diagram of a preferred embodiment of an APD detector circuit 40 for gated detection of optical pulses according to the present invention. APD detector circuit 40 includes four transmission lines T1–T4, a coupling capacitor C1, an avalanche photodiode APD1 and a biasing network embodied as resistor R1. Coupling capacitor C1, avalanche photodiode APD1 and resistor R1 are configured similarly to the configuration of conventional APD detector circuit 20 shown in FIG. 2. Preferably, avalanche photodiode APD1 is a cooled InGaAs or Ge APD, but other pulsed-biased avalanche-type photon detector devices can be used, such as a photomultiplier (PMT) device or a multichannel plate (MCP) device. The biasing network (R1) can alternatively be embodied as a blocking inductor or as a blocking inductor in series with a resistor with a by-pass capacitor to ground.

Transmission lines T1–T4 all have the same characteristic impedance $Z_0$ and can be formed from coaxial transmission lines, as depicted in FIG. 4, or can be formed using stripline or waveguide techniques. Both transmission lines T1 and T2 are coupled to the cathode of avalanche photodiode APD1 through coupling capacitor C1. Transmission lines T3 and T4 are coupled to the anode of avalanche photodiode APD1. Transmission line T2 has an open-circuit termination OC at the end that is distal to avalanche photodiode APD1. Transmission line T3 has a short-circuit termination SC at the end that is distal to avalanche photodiode APD1. A reflection coefficient $r_{OC}$ associated with open-circuit termination OC is opposite to a reflection coefficient $r_{SC}$ that is associated with short-circuit termination SC, that is, $r_{SC}=-r_{OC}$.

A DC bias voltage $V_{DC}$ is applied to avalanche photodiode APD1 through resistor R1, which is nominally 10K–30K Ohms, so that avalanche photodiode APD1 is reverse biased below the reverse breakdown voltage $V_{br}$ of avalanche photodiode APD1. A bias pulse $V_{pulse}$ having a duration of ~1 ns and an amplitude of 3–5 V is applied to avalanche photodiode APD1 through transmission line T1. Coupling capacitor C1, which is nominally 0.1 $\mu$F, couples bias pulse $V_{pulse}$ to the cathode of avalanche photodiode APD1, while simultaneously isolating DC bias voltage $V_{DC}$ from a pulse generator 41 that generates $V_{pulse}$ and from transmission lines T1 and T2.

When bias pulse $V_{pulse}$ reaches avalanche photodiode APD1, the capacitance (less than about 1 pF) across reverse-biased avalanche photodiode APD1 couples bias pulse $V_{pulse}$ to transmission lines T3 and T4. Bias pulse $V_{pulse}$ is only slightly perturbed by the presence of avalanche photodiode APD1 because avalanche photodiode APD1, being reverse biased, presents a high impedance to transmission line T1. Consequently, bias pulse $V_{pulse}$ continues to propagate towards the left of FIG. 4 along transmission line T2.

Figure 5C:
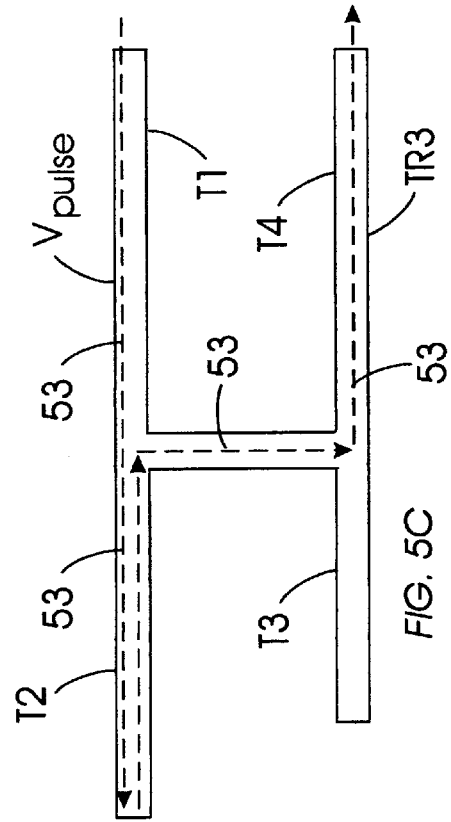
FIGS. 5A–5D show signal paths of transients through an APD detector circuit according to the present invention.
Figure 5D:
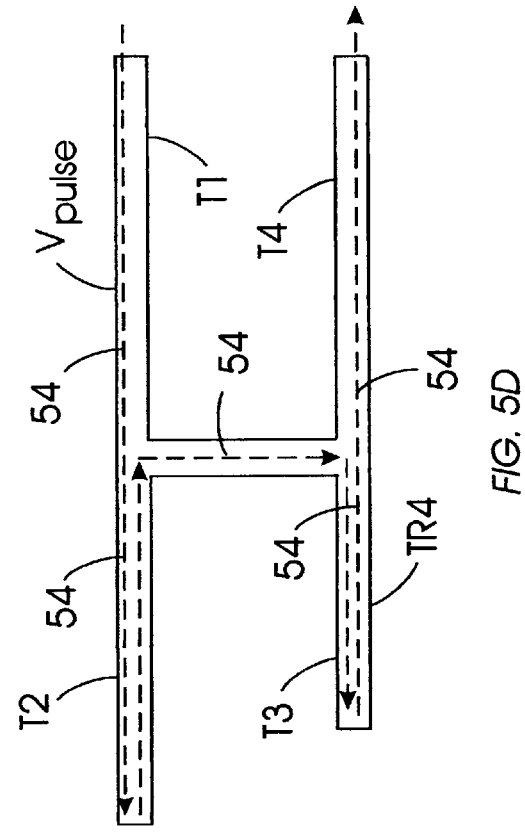
Figure 5A:
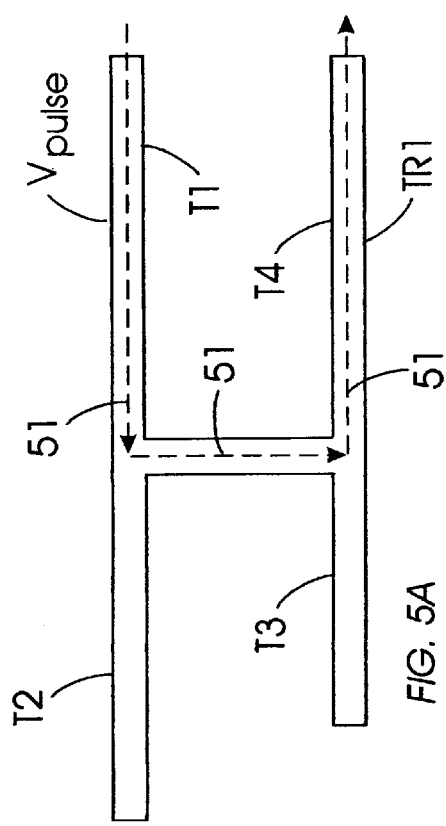

A capacitively-coupled transient produced by the initial encounter of bias pulse $V_{pulse}$ with avalanche photodiode APD1 propagates towards the right of FIG. 4 along transmission line T4 (transient TR1) and towards the left of FIG. 4 along transmission line T3 (transient TR2). FIG. 5A shows a signal path 51 of $V_{pulse}$ and transient TR1 through APD detector circuit 40. Transient TR1 forms a first component of the output signal from detector circuit 40 that is detected by receiver 42.

Figure 5B:
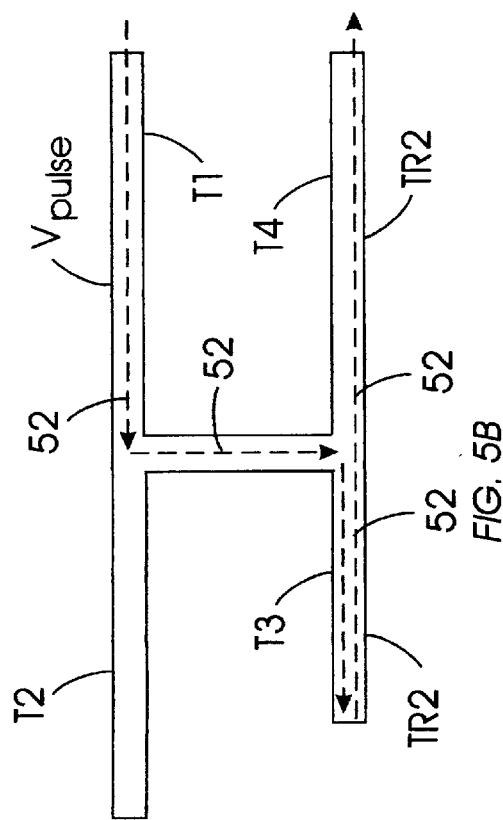
Figure 6A:
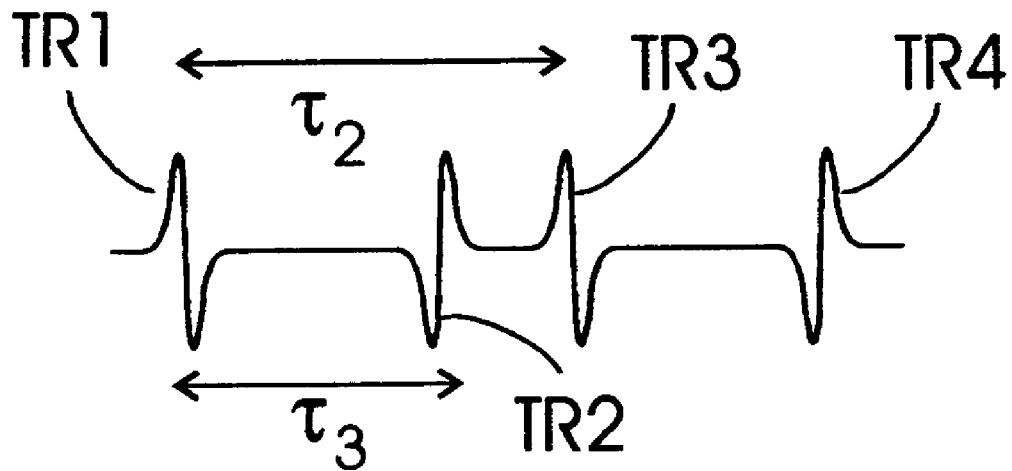
FIGS. 6A and 6B show idealized output waveforms of an APD detector circuit according to the present invention.

When transient TR2 propagates towards the left on transmission line T3 and reaches the short-circuit termination at the distal end of transmission line T3, transient TR2 is inverted and is reflected back along transmission line T3 toward the right of FIG. 4. TR2 returns to the anode of APD1 after a time $\tau_3$. FIG. 5B shows a signal path 52 of $V_{pulse}$ and transient TR2 through APD detector circuit 40. Transient TR2 forms a second component of the output signal from detector circuit 40, as shown in FIG. 6A and in oscillograph 71 in FIG. 7.

Meanwhile, bias pulse $V_{pulse}$ has propagated down transmission line T2 towards the left of FIG. 4. At the end of transmission line T2, which is terminated in an open circuit, bias pulse $V_{pulse}$ is reflected at the open-circuited termination without inversion. The reflected bias pulse $V_{pulse}$ propagates to the right in FIG. 4 along transmission line T2, and again encounters avalanche photodiode APD1 after a time $\tau_2$.

A second capacitively-coupled transient is generated on transmission lines T3 and T4, which splits into transients TR3 and TR4 respectively propagating towards the right on transmission line T4 toward the output and toward the left on transmission line T3. FIG. 5C shows a signal path 53 of bias pulse $V_{pulse}$ and transient TR3 through APD detector circuit 40. Transient TR3 forms a third component of the output signal from detector circuit 40, as shown in FIG. 6A and in oscillograph 71 in FIG. 7.

When transient TR4 propagates towards the left on transmission line T3 and reaches the short-circuit termination at the distal end of transmission line T3, transient TR4 is inverted and is reflected back along transmission line T3 toward the right of FIG. 4, returning to the APD anode after a time $\tau_3$. FIG. 5D shows a signal path 54 of bias pulse $V_{pulse}$ and transient TR4 through APD detector circuit 40. Transient TR4 forms a fourth component of the output signal from detector circuit 40, as shown in FIGS. 6A, 6B, 7 and 8.

Figure 6B:
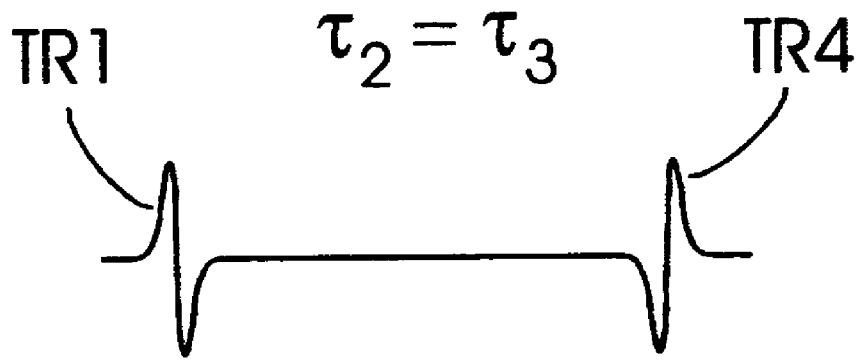
Figure 7:
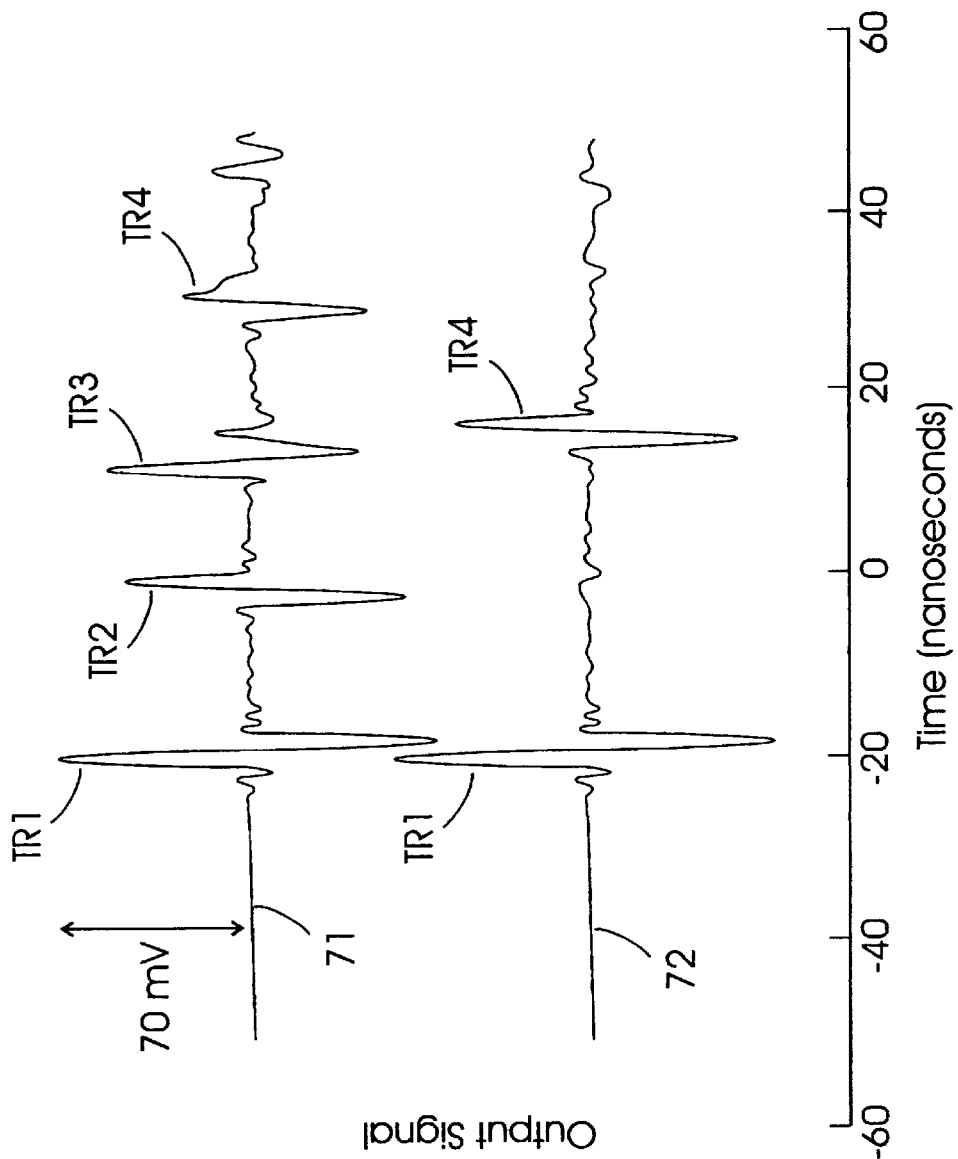
FIG. 7 shows representative oscillographs corresponding to the idealized output waveforms of FIGS. 6A and 6B.

Because bias pulse $V_{pulse}$ and its reflection are applied to avalanche photodiode APD1 separated in time by $\tau_2$ (about 10 ns for the circuit shown in FIG. 4), and because each pulse gives rise to a pair of relatively inverted pulses on output transmission line T4 separated by a time $\tau_3$, the output of circuit 40 will generally include four transients TR1–TR4, as shown in FIG. 6A and in oscillograph 71 in FIG. 7. If the round-trip propagation delays $\tau_2$ and $\tau_3$ for transmission lines T2 and T3, respectively, are precisely matched so that they are substantially the same, transients TR2 and TR3 appearing at the output will overlap and cancel, as shown in FIG. 6B, oscillograph 72 in FIG. 7 and oscillograph 81 in FIG. 8. Provided that transmission lines T2 and T3 are matched in propagation delay and behave linearly, the cancellation is excellent even when transmission lines T2 and T3 exhibit propagation characteristics such as absorption and dispersion. The length of transmission lines T2 and T3 can be shortened to correspond to the pulse width of bias pulse $V_{pulse}$.

FIG. 7 shows representative oscillographs corresponding to the idealized output waveforms of FIGS. 6A and 6B for a Fujitsu InGaAs B avalanche photodiode having a DC bias voltage of 44.5 $V_{DC}$ and a pulse bias voltage $V_{pulse}$ of 3 V. The oscillograph represented in FIG. 7 shows data taken at room temperature, rather than at cryogenic temperatures (~120 K) used for single-photon counting. The breakdown voltage of an avalanche photodiode is temperature dependent, so that a higher value of $V_{DC}$ is required at room temperature (~50 V) than at ~120 K (~30 V). Oscillograph 71 in FIG. 7 corresponds to the idealized waveform shown in FIG. 6A with $\tau_2 \neq \tau_3$, while oscillograph 72 corresponds to the idealized waveform shown in FIG. 6B, where $\tau_2 = \tau_3$. The peak amplitude of a transient TR1 shown in FIG. 7 is about 70 mV greater than the baseline signal for both oscillographs 71 and 72.

Figure 8:
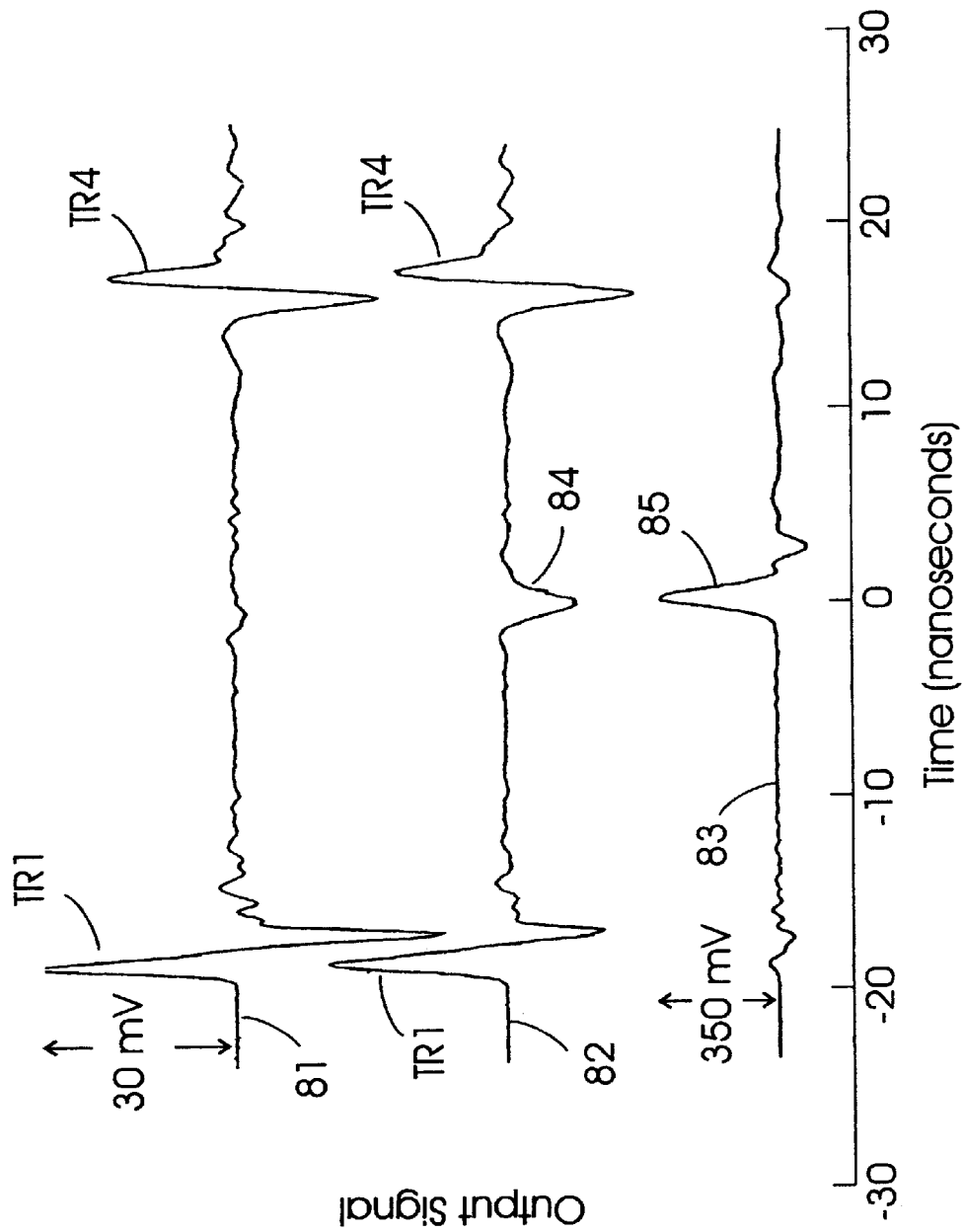
FIG. 8 shows another set of representative oscillographs corresponding to the idealized output waveform of FIG. 6B with and without a detected photon, and a representative oscillograph for a gated, amplified output of an APD detector circuit affording to the present invention.

FIG. 8 shows another set of representative oscillographs 81 and 82 of the output from APD detector circuit 40 according to the present invention. Oscillographs 81 and 82 both have matched delays ($\tau_2=\tau_3$), corresponding to the waveform of FIG. 6B, and respectively show the detector output waveform in the absence of a detected photon and in the presence of a detected photon. When an incident photon triggers an avalanche during either one of the two bias pulses applied to avalanche photodiode APD1, the cancellation of transients TR2 and TR3 will be disturbed and a net photon-induced signal is generated with respect to a transient-free flat baseline where transients TR2 and TR3 overlap, as shown in oscillograph 82 in FIG. 8. The peak amplitude of transient TR1 shown in the representative oscillographs 81 and 82 of FIG. 8 is about 30 mV greater than the baseline signal for both oscillographs. The peak amplitude of the gated and amplified pulse signal 85 corresponding to a detected photon in oscillograph 83 is about 350 mV greater than the baseline signal.

While APD detector circuit 40 is shown configured with transmission lines T1–T4, transmission lines T1 and T4 can alternatively be replaced by other circuitry as long as the characteristic impedance of the replacement circuitry matches the characteristic impedance of transmission lines T2 and T3. For example, transmission line T1 can be replaced by an amplifier output circuit that has an output impedance that matches the characteristic impedance of both transmission lines T2 and T3, and transmission line T4 can be replaced by a receiver circuit that has an input impedance that matched the characteristic impedance of both transmission lines T2 and T3.

In another alternative configuration of APD detector circuit 40, transmission line T2 can be eliminated and a pulse generator used that generates a pair of pulses. When the reflective termination of transmission line T3 is a short-circuit termination, the pair of pulses must be substantially identical to each other. When the reflective termination of transmission line T3 is an open-circuit termination, the pair of pulses must be substantially inverted replicas of each other. In practice, though, a pair of matched cables automatically provides matched and cancelling transients in a simple, convenient and robust manner.

In yet another alternative configuration of APD detector circuit 40, transmission lines T2 and T3 are exchanged. That is, a transmission line is coupled to the cathode of APD1 that has a short-circuit termination at the end that is distal to avalanche photodiode APD1, and a transmission line is coupled to the anode of avalanche photodiode APD1 that has an open-circuit termination at the end that is distal to avalanche photodiode APD1. This approach causes the bias pulse producing the reference transient to subtract from instead of adding to the DC bias. This variation will work if the capacitance of the avalanche photodiode is not significantly dependent on the applied voltage. For the preferred avalanche photodiodes, the capacitance does depend slightly on the applied voltage, so for better cancellation, the bias pulses are preferred to be the same polarity.

Figure 9:
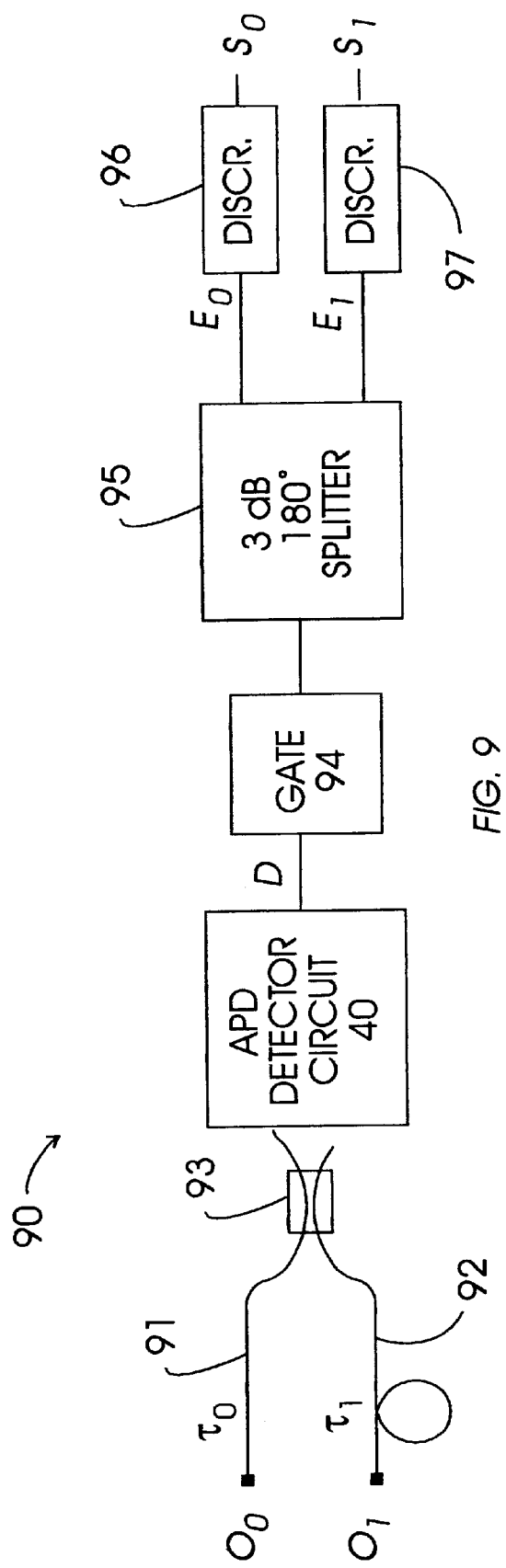
FIG. 9 shows a schematic block diagram of an exemplary receiver circuit for a quantum cryptographic system in which an APD detector circuit according to the present invention can be used.

An electronic gate can be connected to the output of APD detector circuit 40 for removing transient components TR1 and TR4 so that a discriminator receives only a photon-induced, transient-free signal. FIG. 9 shows an exemplary APD detector circuit having a gate circuit 94 connected to the output of APD detector circuit 40. A suitable electronic gate for gate circuit 94 is a high frequency double-balanced mixer, such as a Minicircuits ZEM-2B, having a suitable electronic gate pulse applied (e.g., 0.5 V for 2 ns). An oscillograph of a gated amplified output of APD detector circuit 40, as output to a discriminator, is shown in oscillograph 83 in FIG. 8.

When a photon is incident upon avalanche photodiode APD1 during the first bias pulse, the photon-induced output signal is a negative-going signal, as shown by signal pulse 84 in in oscillograph 82 in FIG. 2B, having been reflected from the short-circuit termination. When a photon is incident upon the avalanche photodiode APD1 during the second bias pulse, the photon-induced output signal is positive-going because it propagates directly out on transmission line T4.

Figure 10:
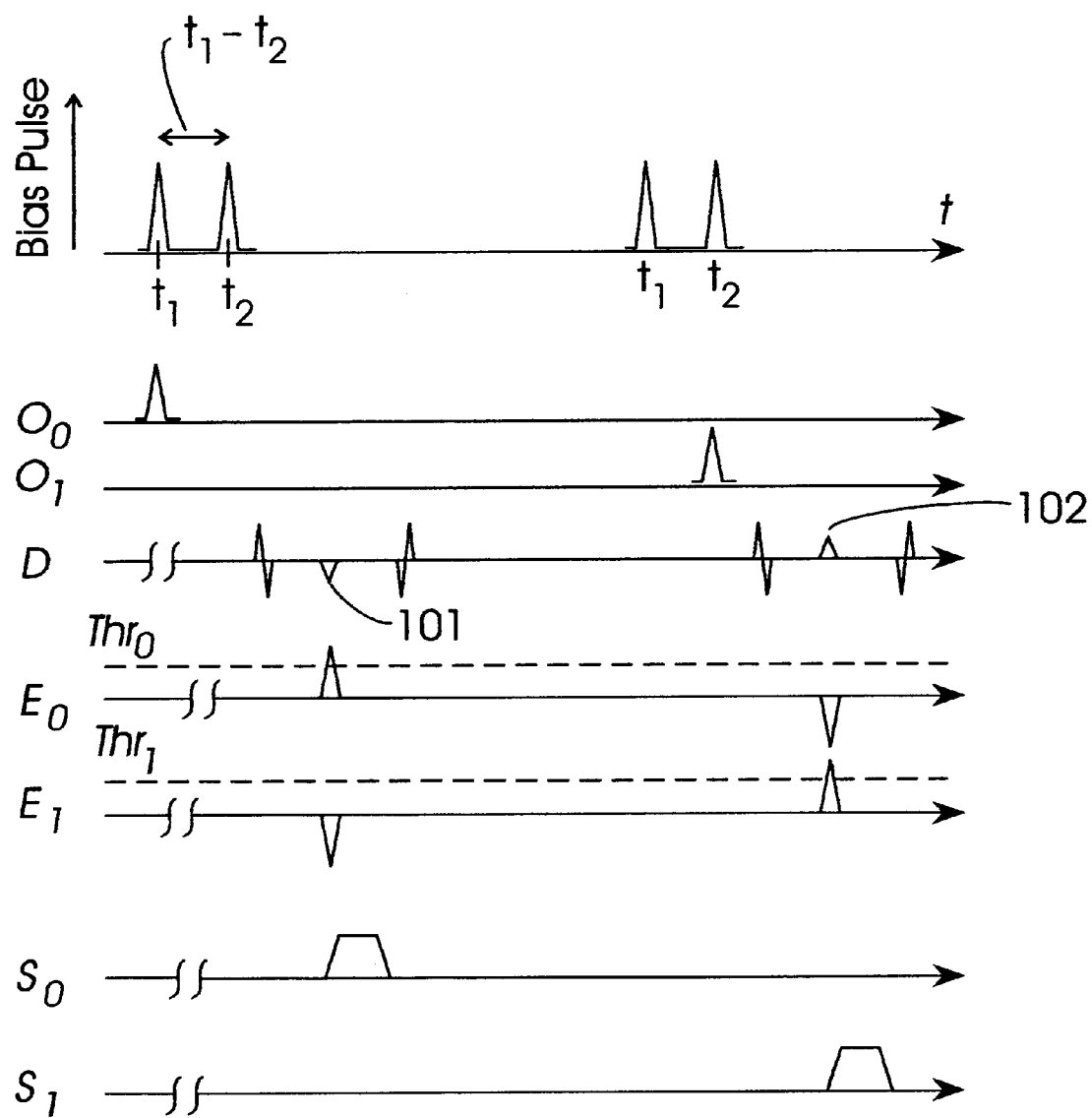
FIG. 10 shows a timing diagram for the receiver circuit of FIG. 9.

FIG. 9 shows a schematic block diagram of an exemplary receiver circuit 90 for a quantum cryptographic system in which an APD detector circuit according to the present invention is well-suited. FIG. 10 shows a timing diagram for receiver circuit 90. In a quantum cryptographic system, on average less than a single photon is transmitted in a given time slot so that by design only one channel at a time carries a photon. Exemplary receivers for a quantum cryptographic system are disclosed by U.S. Pat. No. 5,307,410 to C. H. Bennett; C. H. Bennett et al., Quantum Cryptography: Public key distribution and coin tossing, Proc. Int. Conf. Computer Systems and Signal Processing, pp. 175–179, 1984; and by C. H. Bennett et al., J. Cryptol., Vol. 5, p. 3, 1992.

In FIG. 9, receiver circuit 90 includes two separate optical channels 91 and 92 that are connected to a combiner 93. Combiner 93 is connected to a single APD detector circuit 40 that monitors both optical channels without information loss. The output of APD detector circuit 40 is connected to an electronic gate circuit 94. The output of electronic gate circuit 94 is connected to a 3 dB, 180° splitter 95. Splitter 95 has two outputs that are respectively connected to a discriminator 96 and a discriminator 97.

Photons arrive via two separate fiber optic channels 91 and 92. The two optical channels, corresponding to bit values "0" and "1", are combined at combiner 93. Optical channel 91 has a time delay of $\tau_0$ and optical channel 92 has a time delay $\tau_1$ so that the difference between time delay $\tau_0$ and $\tau_1$ is equal to the time interval between the APD bias pulses. The arrival time of a photon, and hence the transmitted bit value, can be distinguished by the sign of the background-free signal provided by APD detector circuit 40. For example, photons that are incident upon avalanche photodiode APD1 during the first bias pulse ($O_0$ at time $t_1$ in FIG. 10) generate a negative-going net signal, such at that shown in oscillograph 82 in FIG. 8 and at 101 of detector output D in FIG. 10. Photons that are incident upon avalanche photodiode APD1 during the second bias pulse ($O_1$ at time $t_2$ in FIG. 10) generate a positive-going net signal, such as that shown at 102 of detector output D in FIG. 10.

Gate circuit 94 gates and amplifies detector output signal D in a well-known manner. The output of gate circuit 94 is input to splitter 95. Splitter 95 is a simple 180° splitter that has two output signals $E_0$ and $E_1$ that are respectively input to discriminators 96 and 97. Discriminators 96 and 97 provide separate detection and outputs for the "0" and "1" channels. When signal $E_0$ exceeds predetermined threshold $Thr_0$, discriminator 96 outputs a signal $S_0$. Similarly, when signal $E_1$ exceeds predetermined threshold $Thr_1$, discriminator 97 outputs a signal $S_1$.

Figure 11:
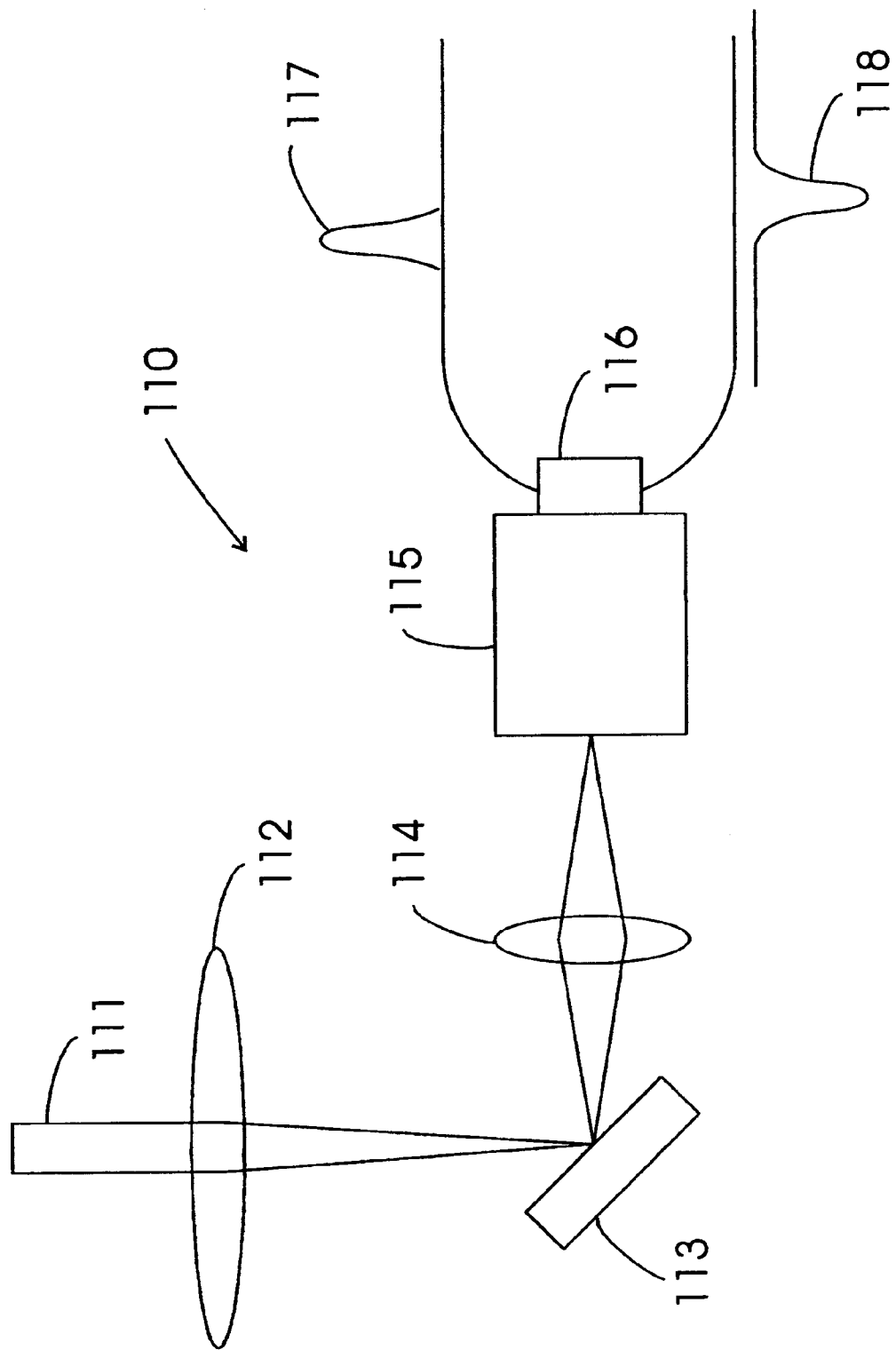
FIG. 11 shows a schematic block diagram of an exemplary receiver circuit for a spectroscopy system in which an APD detector circuit according to the present invention can be used.

The present invention can be incorporated in a spectroscopy system in which the sensitivity of the detector is gated, either for avoiding a bright, unwanted light signal, such as a laser pulse, or for deriving information about time variation of a signal by scanning the gate time with respect to some triggering event. FIG. 11 shows a schematic block diagram of an exemplary receiver circuit 110 for a spectroscopy system in which an APD detector circuit according to the present invention can be used. In FIG. 11, a laser pulse 111 is focussed by a lens 112 onto a target 113 at time t. Light from target 113 is collected by a lens 114 and directed to a spectrometer 115. A spectrally selected portion of the light exits spectrometer 115 and strikes a photo detector system 116, such as APD detector circuit 40 shown in FIG. 4.

A voltage pulse 117 is supplied to detector 116 at a variable time Δt after the laser pulse strikes the target, and detector 116 produces a transient free output signal 118. An APD-type detector can be used in the photon-counting Geiger mode for very weak signals or, by keeping the peak bias voltage below $V_{br}$, it can be used in linear mode, providing signals proportional to the light intensity during the bias pulse. In a case where the photdetector 116 is operated in the linear mode, and is arranged so that applied voltage pulse 117 gives rise to two bias pulses that are separated by a time τ and have the same polarity applied to the avalanche photon detector 116, the output signal will be proportional to the intensity difference of the light signals present at detector 116 at times (t+Δt) and (t+Δt+τ). If the signs of the reflection coefficients are reversed for the cathode and anode delay lines, the two bias pulses will have opposite polarity, and the signal corresponding to an increased bias will be exponentially larger than that corresponding to a reduced bias. Thus, only the former case contributes significantly to the output signal, which will, therefore, be proportional to the light intensity at the detector at (t+Δt). In either case, the gain of the detector is greatly reduced at the earlier time t when the laser strikes the target so that saturation of the detector and electronics is avoided.

Additionally, the technique of present invention can also be used with photomultiplier and multiplier channel plate detectors and other type detectors that use a pulse-bias technique so that an unwanted capacitively-coupled transient is cancelled from a desired photo-induced signal. Although PMTs are typically gated with signals having rise times on the order of 100 ns, in principle much faster gating is possible. The output pulse from a PMT is typically a few nanoseconds wide caused by variations in the electron transit times. Gating on a similar timescale, i.e., less than 10 ns, is therefore feasible with the present invention.

While the present invention has been described in connection with the illustrated embodiments, it will be appreciated and understood that modifications may be made without departing from the true spirit and scope of the invention.

What is claimed is:

1. An avalanche detector circuit, comprising:
   an avalanche photon detector device having a first terminal and a second terminal;
   a first transmission line having first and second ends, the first end of the first transmission line being coupled to the first terminal of the avalanche photon detector device and the second end of the first transmission line being terminated by a first reflective termination, the first reflective termination having a first reflection coefficient, and the first transmission line having a round-trip propagation delay along the first transmission line; and a second transmission line having first and second ends, the first end of the second transmission line being coupled to the second terminal of the avalanche photon detector device and the second end of the second transmission line being terminated by a second reflective termination, the second reflective termination having a second reflection coefficient that is opposite from the first reflection coefficient, the second transmission line having a round-trip propagation delay along the second transmission line, and the round-trip propagation delay along the second transmission line being substantially equal to the round-trip propagation delay along the first transmission line.

2. The avalanche detector circuit according to claim 1, wherein the first reflective termination is an open-circuit termination and the second reflective termination is a short-circuit termination.

3. The avalanche detector circuit according to claim 1, wherein the first reflective termination is a short-circuit termination and the second reflective termination is an open-circuit termination.

4. The avalanche detector circuit according to claim 1, further comprising a bias network having first and second terminals, the first terminal of the bias network being coupled to the first terminal of the avalanche photon detector device, and the second terminal of the bias network being coupled to a bias voltage so that the avalanche photon detector device is reverse biased.

5. The avalanche detector circuit according to claim 4, wherein the bias network includes a resistor.

6. The avalanche detector circuit according to claim 4, wherein the bias network includes an inductor.

7. The avalanche photon detector circuit according to claim 1, further comprising a coupling capacitor having first and second terminals, the first terminal being coupled to the first terminal of the avalanche photon detector device and the second terminal being coupled to the first end of the first transmission line.

8. The avalanche detector circuit according to claim 7, wherein a bias pulse voltage $V_{pulse}$ is coupled to the second terminal of the coupling capacitor, the bias pulse voltage reverse biases the avalanche photon detector device to be greater than a reverse breakdown voltage $V_{br}$ of the avalanche photon detector device during a duration of the bias pulse voltage $V_{pulse}$.

9. The avalanche detector circuit according to claim 1, wherein the first and second transmission lines are formed by coaxial cables.

10. The avalanche detector circuit according to claim 1, wherein the first and second transmission lines are formed by stripline transmission lines.

11. The avalanche detector circuit according to claim 1, wherein the first and second transmission lines are formed by waveguides.

12. The avalanche detector circuit according to claim 1, wherein the first and second transmission lines have propagation characteristics that are matched.

13. The avalanche detector circuit according to claim 1, wherein the avalanche photon detector device is one of an avalanche photodiode, a photomultiplier device and a multichannel plate device.

14. The avalanche detector circuit according to claim 1, further comprising:

a third transmission line having first and second ends, the first end of the third transmission line being coupled to the first terminal of the avalanche photon detector device; and a fourth transmission line having first and second ends, the first end of the fourth transmission line being coupled to the second terminal of the avalanche photon detector device.

15. An avalanche detector circuit, comprising:

an avalanche photon detector device having a first terminal and a second terminal;

a pulse generator coupled to the first terminal of the avalanche photon detector device and outputting first and second pulses having a predetermined temporal spacing; and a transmission line having first and second ends, the first end of the transmission line being coupled to the second terminal of the avalanche photon detector device and the second end of the transmission line being terminated by a reflective termination, and the transmission line having a round-trip propagation delay along the transmission line that is substantially equal to the predetermined temporal spacing between the first and second pulses.

16. The avalanche detector circuit according to claim 15, wherein the reflective termination is a short-circuit termination, and the first and second pulses are substantially identical to each other.

17. The avalanche detector circuit according to claim 15, wherein the reflective termination is an open-circuit termination, and the first pulse is substantially an inverted replica of the second pulse.

18. The avalanche detector circuit according to claim 15, further comprising a bias network having first and second terminals, the first terminal of the bias network being coupled to the first terminal of the avalanche photon detector device, and the second terminal of the bias network being coupled to a bias voltage so that the avalanche photon detector device is reverse biased.

19. The avalanche detector circuit according to claim 18, wherein the bias network includes a resistor.

20. The avalanche detector circuit according to claim 18, wherein the bias network includes an inductor.

21. The avalanche detector circuit according to claim 15, further comprising a coupling capacitor having first and second terminals, the first terminal being coupled between the first terminal of the avalanche photon detector device coupled and the pulse generator.

22. The avalanche detector circuit according to claim 21, wherein a bias pulse voltage $V_{pulse}$ is coupled to the second terminal of the coupling capacitor, the bias pulse voltage reverse biases the avalanche photon detector device to be greater than a reverse breakdown voltage $V_{br}$ of the avalanche photon detector device during a duration of the bias pulse voltage $V_{pulse}$.

23. The avalanche detector circuit according to claim 15, wherein the transmission line is formed by a coaxial cable.

24. The avalanche detector circuit according to claim 15, wherein the transmission line is formed by a stripline transmission line.

25. The avalanche detector circuit according to claim 15, wherein the transmission line is formed by a waveguide.

26. The avalanche detector circuit according to claim 15, wherein the avalanche photon detector device is one of an avalanche photodiode, a photomultiplier device and a multichannel plate device.

27. An avalanche photon detector system, comprising:
 a photon detector circuit generating an output signal in response to an incident photon, the photon detector circuit including:
  an avalanche photon detector device having a first terminal and a second terminal,
  a first transmission line having first and second ends, the first end of the first transmission line being coupled to the first terminal of the avalanche photon detector device and the second end of the first transmission line being terminated by a first reflective termination, the first reflective termination having a first reflection coefficient, and the first transmission line having a round-trip propagation delay along the first transmission line, and
  a second transmission line having first and second ends, the first end of the second transmission line being coupled to the second terminal of the avalanche photon detector device and the second end of the second reflective transmission line being terminated by a second reflective termination, the second reflective termination having a second reflection coefficient that is opposite from the first reflection coefficient, the second transmission line having a round-trip propagation delay along the second transmission line, and the round-trip propagation delay along the second transmission line being substantially equal to the round-trip propagation delay along the first transmission line; and
 a discriminator circuit responsive to the output signal of the photon detector circuit by generating a photon detection signal when the output signal of the photon detector circuit exceeds a predetermined threshold.

28. The avalanche photon detector system according to claim 27, wherein the first reflective termination is an open-circuit termination and the second reflective termination is a short-circuit termination.

29. The avalanche photon detector system according to claim 27, wherein the first reflective termination is a short-circuit termination and the second reflective termination is an open-circuit termination.

30. The avalanche photon detector system according to claim 27, wherein the photon detector circuit further includes a bias network having first and second terminals, the first terminal of the bias network being coupled to the first terminal of the avalanche photon detector device, and the second terminal of the bias network being coupled to a bias voltage so that the avalanche photon detector device is reverse biased.

31. The avalanche photon detector system according to claim 30, wherein the bias network includes a resistor.

32. The avalanche photon detector system according to claim 30, wherein the bias network includes an inductor.

33. The avalanche photon detector system according to claim 27, further comprising a coupling capacitor having first and second terminals, the first terminal being coupled to the first terminal of the avalanche photon detector device and the second terminal being coupled to the first end of the first transmission line.

34. The avalanche photon detector system according to claim 33, wherein a bias pulse voltage $V_{pulse}$ is coupled to the second terminal of the coupling capacitor, the bias pulse voltage reverse biases the avalanche photon detector device to be greater than a reverse breakdown voltage $V_{br}$ of the avalanche photon detector device during a duration of the bias pulse voltage $V_{pulse}$.

35. The avalanche photon detector system according to claim 27, wherein the first and second transmission lines are formed by coaxial cables.

36. The avalanche photon detector system according to claim 27, wherein the first and second transmission lines are formed by stripline transmission lines.

37. The avalanche photon detector system according to claim 27, wherein the first and second transmission lines are formed by waveguides.

38. The avalanche photon detector system according to claim 27, wherein the first and second transmission lines have propagation characteristics that are matched.

39. The avalanche photon detector system according to claim 27, wherein the avalanche photon detector device is one of an avalanche photodiode, a photomultiplier device and a multichannel plate device.

40. The avalanche photon detector system according to claim 27, wherein the photon detector circuit further includes:
 a third transmission line having first and second ends, the first end of the third transmission line being coupled to the first terminal of the avalanche photon detector device; and
 a fourth transmission line having first and second ends, the first end of the fourth transmission line being coupled to the second terminal of the avalanche photon detector device.

41. The avalanche photon detector system according to claim 27, wherein the avalanche photon detector system is part of a quantum cryptographic system.

42. The avalanche photon detector system according to claim 27, wherein the avalanche photon detector system is part of a gated-MCP detector system.

43. The avalanche photon detector system according to claim 27, wherein the avalanche photon detector system is part of a photomultiplier system.

44. The avalanche photon detector system according to claim 27, wherein the avalanche photon detector system is part of a spectroscopy system.

* * * * *